United States Patent Office 3,295,994
Patented Jan. 3, 1967

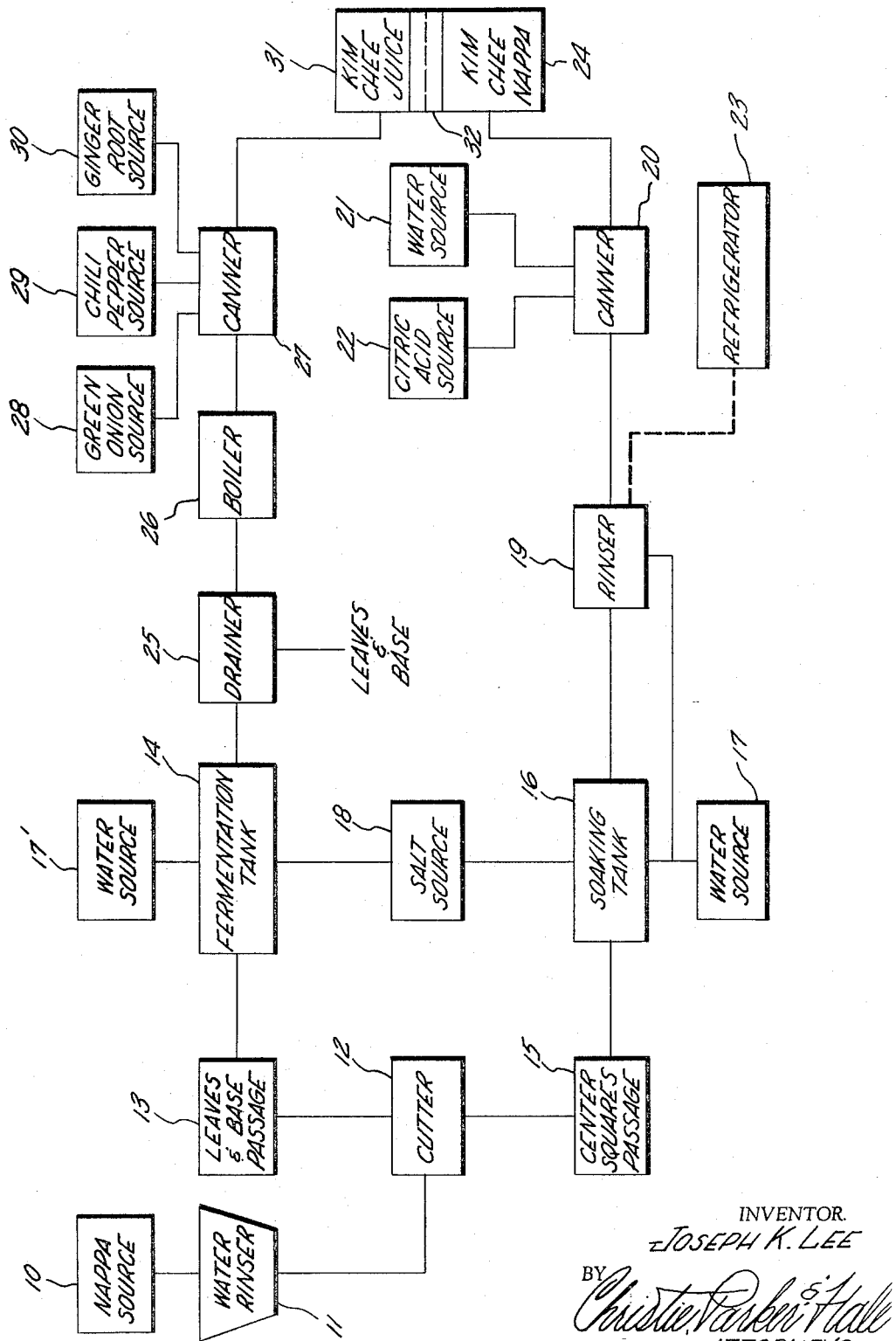

3,295,994
KIM CHEE PICKLE CANNING
Joseph K. Lee, 10616 Bramble Bush Ave.,
Whittier, Calif. 90604
Filed Aug. 3, 1962, Ser. No. 214,638
6 Claims. (Cl. 99—154)

This application is a continuation-in-part of my copending application, Serial No. 116,848, filed June 13, 1961, now abandoned.

The present invention relates to making Kim Chee pickle by utilizing intermediate products which are stored and subsequently recombined to make the pickle, and the method for making the intermediate products.

Kim Chee pickle, which is pickled nappa, a well-known delicacy, native to Japan and Korea, Kim Chee being the Korean term for this type of pickle, and nappa being the Japanese term for a type of cabbage like celery cabbage. Heretofore, when it has been desired to have Kim Chee pickle for human consumption, it has been necessary to prepare the pickle from fresh nappa, specifically for the occasion on which it was to be consumed. While various attempts have been made heretofore to preserve Kim Chee pickle, these attempts have been unsuccessful, in that the preserved product has lost much of its natural tastiness, due to the steps taken to effect preservation. Furthermore, since Kim Chee pickle is a fermentation product, the canning of conventionally prepared Kim Chee has not stopped the further fermentation of the pickle in the can. The pickle in the can has continued to activate, causing the can to swell and often explode or the Kim Chee pickle to become spoiled.

According to the present invention in its preferred embodiment, Kim Chee pickle is prepared, as required for consumption by combining an intermediate juice prepared in accordance with the invention with an intermediate portion of nappa processed according to the invention, or with fresh nappa if desired, in which case, the nappa is combined with the intermediate juice and allowed to ferment to the state desired for consumption. The intermediate juice of the invention is not subject to further activation while it remains canned, so that it does not become spoiled or cause the can to swell or explode.

If the intermediate nappa prepared according to the invention is to be utilized, this intermediate similarly does not become active while canned, and may be retained indefinitely in its canned state. While it is commonly a requirement that canned goods be cooked prior to commercial distribution, the practice of the invention results in intermediate products which need not be so cooked in order to preserve their proper condition. However, if such cooking is required by local regulations, the intermediate products may be cooked without significant adverse effects resulting in the intermediates.

In an alternate embodiment, the nappa and fermented juice are recombined and canned together to provide an instantly available product which must, however, be kept under refrigeration. In this embodiment, the fermented juice is heated to boiling and poured over nappa already in the container. The container is then sealed and refrigerated.

The intermediate juice utilized to make Kim Chee pickle is produced by the fermentation of nappa in a saline solution to an acid state having a pH of about 3.8. Such fermentation usually requires, utilizing the method of the invention, a period of from two to four days. After the required pH is reached, the liquid is drained from the mixture and canned. In the preferred embodiment of the intermediate juice product, red chili pepper, minced green onions and ginger root are added to the drained liquid. The intermediate nappa utilized in one embodiment of the invention, that embodiment in which fresh nappa is not subsequently combined with the intermediate juice, is prepared by adding nappa, preferably in the form of squares, to a saline solution, allowing this mixture to ferment until the mixture reaches the required pH, then straining the nappa from the solution and canning the strained nappa. In the preferred embodiment, the strained nappa is washed, and citric acid added prior to canning. The juice is boiled for a period of about five minutes to terminate fermentation, and then canned. The canned juice rises slightly in pH, but does not exceeed a pH of about 4.1 upon storage without refrigeration. If fermentation is stopped before a pH of 3.8 is reached, the juice will continue to ferment upon canning unless refrigerated, and will therefore spoil and cause the can to swell or explode. If fermentation is allowed to continue so that the mixture becomes more acid than a pH of about 3.8, the taste and quality of the juice and therefore the pickle, is impaired. Thus, a pH of from 3.7 to 3.9 should be attained in fermentation for the most satisfactory results.

When it is then desired to serve Kim Chee pickle, the intermediate juice product is combined with the intermediate nappa product or with fresh nappa, and this mixture is allowed to ferment as appropriate to obtain a product meeting the personal preference of the consumer as to its state of fermentation. For example, an especially acceptable degree of fermentation is obtained by combining the canned nappa and canned juice and allowing this mixture to stand for three days at room temperature.

The invention may be more readily understood by referring to the accompanying drawing which is a block diagram of the method for producing the intermediate juice product and intermediate nappa product.

In the drawing, nappa from a nappa source 10 is rinsed in a water rinser 11. As used herein, the term "nappa" generally refers to the vegetable often commercially referred to as celery cabbage, although other similar vegetables may be utilized in the practice of the invention, and the term "nappa" is to be understood to include such other vegetables.

The nappa leaving the water rinser 11 passes into a cutter 12, which removes the outer leaves and the base from the nappa and cuts the nappa center into squares. The outer leaves and base leave the cutter through a leaves and base passage 13 and pass into a fermentation tank 14. The center squares leave the cutter 12 through a center squares passage 15 and pass into a soaking tank 16. The soaking tank 16 and fermentation tank 14 have water from water sources 17 and 17' pumped therein. Salt from a salt source 18 is added to each of the tanks 14 and 16, and, together with the water, forms a saline solution.

The center squares remain in the soaking tank 16 for a period in excess of four hours so as to provide adequate soaking of the squares to achieve an acceptable intermediate nappa product. Fermentation is initiated during this four hour soaking period of the center squares. If desired, the center squares can be allowed to ferment up to seven days, although in such case the juice in which the squares ferment will not be of top quality and normally should be discarded. Preferably, the squares are fermented until a pH of about 3.8 is reached.

The center squares leave the soaking tank and pass through a rinser 19 which also has water from the water source 17 applied thereto. On entering the rinser 19 the center squares are strained from the liquid in which they are contained. The center squares are then rinsed by the water from the water source 17. If desired and of proper quality, the liquid from which the center squares are strained may be retained for use as an intermediate juice in the manner to be described subsequently with respect to the fermentation of the leaves and base. In such an embodiment, this liquid can be added directly to the fermentation tank 14 upon straining of the center squares, or can be stored in a separate tank for subsequent combination with the liquid in the fermentation tank 14 prior to canning.

The center squares leaving the rinser 19 are passed to a canner 20, to which water from a water source 21 and citric acid from a citric acid source 22 are applied. In the canner 20, cans (not shown) are filled with the center squares to the desired weight, citric acid is added, and the cans filled with water. The use of water and citric acid in the canning, though not essential, is preferable, for the product so produced has a more acceptable appearance and taste upon opening the can for use. Alternatively, the center squares leaving the rinser 19 may be subjected directly to refrigeration in a refrigerator 23 without being canned. The center squares are then retained under refrigeration until it is desired to combine them with the intermediate juice product. The cans leaving the canner 20 contain a solid intermediate product which will be hereinafter referred to as Kim Chee nappa, as is indicated on a can 24, it being understood that the term Kim Chee nappa is generic to the product and is not used in the trademark sense.

The leaves and base are retained in the fermentation tank 14 for a period normally in excess of two days if at room temperature, in order to allow for sufficient fermentation of the mixture. However, the mixture should not be allowed to activate to a greater extent than the equivalent of fermentation for seven days at room temperature. The time at which the mixture in the fermentation tank 14 has reached the proper state of fermentation according to the practice of the invention is determined by the acidity of the mixture. The mixture should be fermented until a pH of about 3.8 is reached. Upon leaving the fermentation tank 14, the liquid is drained from the leaves and base, by means of a drainer 25, and the leaves and base are then discarded. The liquid from the drainer 25 is pumped into a boiler 26 in which it is boiled for about five minutes. From the boiler 26, the liquid is pumped to a canner 26 where it is canned as the intermediate juice.

In the preferred embodiment, minced green onions from a green onion source 28, red chili pepper from a red chili pepper source 29, and ginger root from a ginger root source 30, are added to the liquid prior to canning. The canned liquid intermediate, hereafter referred to as Kim Chee juice, the term being used as generic to the product and not in the trademark sense, then leaves the canner in the form of a can 31 which, in the preferred embodiment, is attached to the Kim Chee nappa can 24 by means of an adhesive bonding 32 or similar device. Thus the two cans 24 and 31 are attached to each other and present a readily marketable and utilizable combination for the making of Kim Chee pickle.

When it is desired to make Kim Chee pickle, the Kim Chee juice can 31 and Kim Chee nappa can 24 are opened and the contents of the two cans combined. While the contents of the two cans remain separated, no appreciable fermentation of the contents of either can occurs. However, when the contents of the two cans are combined, fermentation is initiated and, after an appropriate period of fermentation, Kim Chee pickle is produced. For example, the contents of the two cans are mixed and allowed to ferment from one to three days at room temperature to produce an especially tasty pickle. The pickle so produced may be stored under refrigeration for a reasonable length of time without adversely affecting its quality while maintaining its fermentation state.

As was previously mentioned, in order to comply with local canning regulations, it may be necessary to cook both the Kim Chee nappa and Kim Chee juice after canning. While the steps of cooking the juice and nappa have not been shown in the drawing, it is to be understood that cooking either or both is included in this particular embodiment of the invention.

In order that the invention may be more readily practiced, the preferred proportions of the various ingredients utilized in producing Kim Chee juice and Kim Chee nappa according to the invention will now be given. However, it will be understood, particularly with respect to the seasonings utilized, that a wide variation in proportions may be made while still achieving an edible product. Thus, the proportions are given by way of illustration, and are not to be considered as limiting the practice of the invention to particular numerical figures stated for the proportions of the ingredients.

In one especially tasty embodiment of the invention, the Kim Chee juice is produced by combining the salt, water, red chili pepper, minced green onions and ginger root in substantially the following proportions per fifty pounds of nappa:

| | | |
|---|---|---|
| Salt | pounds | 1 |
| Water | gallons | 4 |
| Red chili pepper | pounds | 1 |
| Green onions | do | 2 |
| Ginger root | do | 1½ |

In such an embodiment salt, water and citric acid or lactic acid are combined with nappa preferably cut into 1½ inch squares in substantially the following proportions for fifty pounds of nappa:

| | | |
|---|---|---|
| Salt | pounds | 1 |
| Water | gallons | 4 |
| Citric or lactic acid | ounces | 10 |

In another embodiment of the invention, the following ingredients are combined in the following proportions per fifty pounds of nappa cut in one-inch squares:

| | | |
|---|---|---|
| Salt | pounds | ½–1 |
| Water | gallons | 2½ |
| Garlic | pounds | ½ |
| Ginger | do | ½–1 |
| Fresh green onions | do | ½–1 | and allowing the mixture to ferment. The fermentation product is processed by either of two methods.

In the first method, the fermented nappa is strained from the juice. The juice is canned. The fermented nappa is placed in cans and lactic or citric acid, sugar and salt are added. The can is then filled with boiling water and sealed. The sugar, lactic acid and salt may be added in the following proportions per fifty pounds of the original nappa:

| | | |
|---|---|---|
| Sugar | pounds | ½–1 |
| Salt | do | ½–1 |
| Lactic or citric acid | ounces | ½–1½ |

In the second method, the fermented nappa is strained from the juice and placed in cans. The fermented juice is heated to its boiling point and the sugar, salt and lactic acid are added. The juice is then poured into the cans containing the fermented nappa and the cans are sealed. This method produces a product which should be kept under refrigeration until such time as the final fermentation of the Kim Chee is to commence.

While in the drawing and the previous description it has been stated that the leaves and base are cut from the nappa center and the nappa center cut into squares, it is to be understood that such a procedure is not essential to the practice of the invention. That is, while the use of center squares for Kim Chee nappa produces a more attractive product, and the leaves and base removed therefrom, rather than being discarded, are utilized to produce the Kim Chee juice, the practice of the invention is not limited to such a segregation of parts of the nappa. If desired, the entire head of nappa can be cut into squares and allowed to ferment to a pH of 3.8. Conversely, the leaves and base can be discarded and the center squares allowed to so ferment to produce the Kim Chee juice. In either case, the fermented liquid and the fermented cut nappa are separated and separately canned in the manner previously described unless the product is to be kept under refrigeration. If desired, the fermented nappa can be rinsed prior to canning.

In another alternate embodiment of the invention, the consumer supplies his own nappa. The practice of the invention in this embodiment utilizes the Kim Chee juice, and is particularly appropriate where the nappa to be utilized in producing the Kim Chee juice is of comparatively poor quality. The entire nappa head is then utilized in the fermentation producing the Kim Chee juice. The fermented juice is drained from the head, and the comparatively poor quality Kim Chee nappa thereby produced is discarded. The drained juice is canned and opened by the consumer for mixture with fresh nappa. This mixture is then allowed to ferment as appropriate to produce Kim Chee pickle. By using nappa of poor quality, the manufacturer can produce an economical Kim Chee juice whose quality is essentially the same as that if the best quality nappa were used, since the juice is a fermentation product and the nappa itself in such an application, is discarded. The user then can purchase nappa of the quality he desires and rapidly make his own Kim Chee pickle.

The invention claimed is:

1. The method of preparing juice for making Kim Chee pickle, comprising the steps of placing nappa in a saline solution, allowing the mixture to ferment to a pH of about 3.8, draining the liquid from the mixture, boiling the drained liquid for about five minutes to arrest fermentation therein and canning the boiled liquid.

2. The method of claim 1 and in which salt, water, red chili pepper, minced green onions and ginger root are combined with the boiled liquid between boiling the drained liquid and completion of the canning procedure, in substantially the following proportions per 50 pounds of nappa leaves:

| | | |
|---|---|---|
| Salt | pounds | 1 |
| Water | gallons | 4 |
| Red chili pepper | pounds | 1 |
| Green onions | do | 2 |
| Ginger root | do | 1½ |

3. The method of preparing Kim Chee pickle comprising the steps of adding pre-selected first portions of nappa to a first saline solution to form a first mixture, fermenting the first mixture to a pH of about 3.8, draining the liquid from the mixture, boiling the drained liquor to arrest fermentation therein, canning the drained and boiled liquid, adding pre-selected second portions of nappa to a second saline solution to form a second mixture, allowing the second mixture to ferment for a period of from four hours to seven days, straining the nappa from the second mixture, washing the strained nappa to arrest fermentation therein, canning the strained and washed nappa, storing the canned drained liquid and canned strained nappa, removing the drained liquid and the strained nappa from their respective cans, combining the drained liquid and the strained nappa to form a third mixture which ferments of its own accord, and fermenting the third mixture for a selected period.

4. The method of making Kim Chee pickle intermediates consisting of fermenting nappa in a saline solution to a pH of about 3.8, straining the fermented nappa from the solution, washing the strained nappa to arrest fermentation therein, collecting the solution strained from the fermented nappa, canning the washed strained nappa, boiling the collected solution for about five minutes, and canning the boiled solution separate from the canned nappa.

5. The method of making Kim Chee pickle comprising the steps of fermenting nappa in a saline solution to a pH of about 3.8, separating the fermented nappa from the solution, washing the separated nappa, collecting the solution separated from the fermented nappa, canning the washed fermented nappa, boiling the collected solution for about five minutes to arrest fermentation therein, canning the boiled solution, recombining the canned fermented nappa and acid solution, and allowing the recombined nappa and solution to continue fermentation.

6. The method of making Kim Chee pickle comprising the steps of partially fermenting nappa in a saline solution to a pH of about 3.8, straining the partially fermented nappa from the solution, collecting the solution strained from the partially fermented nappa, washing the strained nappa to arrest fermentation therein, placing the washed partially fermented nappa in a container, boiling the collected solution for about five minutes to arrest fermentation therein, pouring the hot solution into the container containing the partially fermented nappa, sealing the container containing the nappa and the solution to provide an intermediate pickle preparation, refrigerating the sealed container containing the intermediate preparation substantially until it is opened to prevent resumption of fermentation in the container, opening the container under conditions free of substantial refrigeration to reinstitute fermentation of the intermediate preparation, and fermenting the intermediate preparation for a selected period to produce the desired pickle.

References Cited by the Examiner

UNITED STATES PATENTS

| | | | |
|---|---|---|---|
| 2,345,814 | 4/1944 | Harrison | 99—156 |
| 2,559,081 | 7/1951 | Marinkovich | 99—186 |
| 2,679,281 | 5/1954 | Palucci | 99—186 X |
| 2,804,390 | 8/1957 | Karble | 99—156 |
| 2,892,722 | 6/1959 | Agan | 99—156 |

OTHER REFERENCES

Morris, H.: "Korean Recipes," copyright 1945, Harriet Morris, 1155 N. River Blvd., Wichita, Kansas, pp. 10 to 12.

A. LOUIS MONACELL, *Primary Examiner.*

R. S. AULL, *Assistant Examiner.*